US009110727B2

(12) United States Patent
Brock et al.

(10) Patent No.: US 9,110,727 B2
(45) Date of Patent: Aug. 18, 2015

(54) AUTOMATIC REPLICATION OF VIRTUAL MACHINES

(75) Inventors: Scott L. Brock, Lake Forest, CA (US); Sumit Kumar Bose, Kamataka (IN); Ronald Leaton Skeoch, Las Vegas, NV (US)

(73) Assignee: Unisys Corporation, Blue Bell, PA (US)

( * ) Notice: Subject to any disclaimer, the term of this patent is extended or adjusted under 35 U.S.C. 154(b) by 340 days.

(21) Appl. No.: 12/959,086

(22) Filed: Dec. 2, 2010

(65) Prior Publication Data
US 2012/0084414 A1   Apr. 5, 2012

Related U.S. Application Data

(60) Provisional application No. 61/389,748, filed on Oct. 5, 2010.

(51) Int. Cl.
| | |
|---|---|
| *G06F 15/177* | (2006.01) |
| *G06F 9/50* | (2006.01) |
| *G06F 11/14* | (2006.01) |
| *G06F 11/20* | (2006.01) |

(52) U.S. Cl.
CPC .......... *G06F 9/5077* (2013.01); *G06F 11/1484* (2013.01); *G06F 11/2097* (2013.01); *Y02B 60/142* (2013.01); *Y02B 60/167* (2013.01)

(58) Field of Classification Search
CPC ............ G06F 9/45558; G06F 11/1484; G06F 11/2097
USPC ................................ 709/221, 226, 224; 718/1
See application file for complete search history.

(56) References Cited

U.S. PATENT DOCUMENTS

| | | | |
|---|---|---|---|
| 8,126,854 B1* | 2/2012 | Sreedharan ................... 707/693 |
| 2003/0018878 A1* | 1/2003 | Dorward et al. ............. 711/216 |
| 2007/0208918 A1* | 9/2007 | Harbin et al. ................. 711/162 |
| 2008/0201455 A1* | 8/2008 | Husain .......................... 709/220 |
| 2010/0211810 A1* | 8/2010 | Zacho .......................... 713/324 |
| 2010/0332657 A1* | 12/2010 | Elyashev et al. ............. 709/226 |
| 2011/0072286 A1* | 3/2011 | Graham ....................... 713/323 |
| 2012/0054367 A1* | 3/2012 | Ramakrishnan et al. ..... 709/242 |
| 2012/0179778 A1* | 7/2012 | DeSwardt et al. ........... 709/217 |

* cited by examiner

*Primary Examiner* — Ruolei Zong
(74) *Attorney, Agent, or Firm* — James E. Goepel

(57) ABSTRACT

Systems and methods are disclosed herein to automatically replicate virtual machine image (VM) files on secondary VM computing devices, from a primary VM computing device. The secondary VM computing devices are automatically selected by constantly reviewing the operating parameter values (e.g., cost of resources, power consumption, etc.) of a number of secondary VM computing devices available of storing VM image replicas. The replica of the primary VM image is stored in the secondary VM computing devices in geographically disparate cloud locations. The primary VM image is automatically broken into constituent data blocks stored in an active index, which is compared against a stale index of data blocks. When an update is detected in the primary VM image, the comparison of indices will indicate that there is new data. Only the new data is used to update the secondary VM images, thereby reducing network traffic and latency issues.

17 Claims, 10 Drawing Sheets

AUTOMATIC REPLICATION OF VIRTUAL MACHINES

This patent application is related to and claims the benefit of Provisional U.S. Patent Application Ser. No. 61/389,748, filed Oct. 5, 2010, which is incorporated herein by reference in its entirety.

TECHNICAL FIELD

The instant disclosure relates generally to a system and method for automatically replicating virtual machines across wide area networks.

BACKGROUND

A virtual machine (VM) is a software platform capable of replicating a computing device with full operating system (OS) and applications functions. The VM is generally installed on a target machine that functions as the host by contributing physical resources like memory, and processing capabilities. A remote device uses client VM software to connect to the remote device and view the VM operating on the target machine. As a result, a virtual machine provides a remote computing device user with a complete software based computing platform separate from the remote computing device on which the software runs. The level of separation between the VM software and the hardware on which it runs establishes the type of virtual machine with the primary types being a system virtual machine and an application virtual machine. A system virtual machine type allows a remote user of the VM to access some of the physical hardware devices on which the VM executes. In contrast, the application VM functions as a stand-alone application platform over which other software applications are implemented. The purpose of the application VM is to enable different operating systems with different file structures to function within an existing native operating system.

The virtual machine data, operations, and functions are assigned to a virtual machine image file in the native memory of a target machine. Remote devices having client VM software installed within the device access the virtual machine image remotely. The image file renders in the client VM software on the remote device as an OS with its overlying applications and data displayed for the user of the remote machine. Any changes made the application, data, or OS is saved to the virtual machine image on the target machine. The VM can be scheduled for execution at geographically disparate cloud locations. However, storing a virtual machine image across networks from one location to another is complicated by the size of the data and the number of users connected to the virtual machine image.

One conventional VM method enabled a share repository of the virtual machine image to be accessible by both the current or primary target machine and a secondary target machine for backup. This required both the primary target machine and a secondary target machine to be on the same sub-net (or within the same local network) for effective results without significant lag. Further, it is difficult to identify remote sites to store replicas of the virtual machine image during a 'live' or in-use session. Problems associated with network latency, long-term and short-term costs of chosen remote sites are some of the issues associated with choosing remote sites for replicating virtual machine image data.

SUMMARY

The systems and methods described herein attempt to overcome the drawbacks discussed above by analyzing the operating costs are a number of remote sites for storing the virtual machine image. A primary remote site is automatically chosen for storing a primary VM image file, and one or more secondary remote sites are automatically chosen for storing secondary replicas of the primary VM image file. Further, only the applicable changes instituted in the virtual machine image by a client computer are sent to amend the secondary virtual machine image at each of the remote sites.

In one embodiment, a computer-implemented method of automatically replicating virtual machines across wide area networks, the method comprising: selecting, from a plurality of secondary backend computing device, at least one secondary backend computing device for storing at least one replica of the first virtual machine for physical hosting of the first virtual machine image; monitoring, in a primary backend computing device, the first virtual machine image for any updates, where the update to the first virtual machine image creates a second virtual machine image; partitioning, in the primary backend computing device, the first virtual machine image into a set of first virtual machine image components, and the second virtual machine image into a set of second virtual machine image components; indexing, in the primary backend computing device, the first set of virtual machine image components into an index of stale virtual machine image components, and the second set of virtual machine image components into an index of active virtual machine image components; comparing, in the primary backend computing device, the set of active virtual machine image components to the set of stale virtual machine components to identify new active virtual machine image components, where the new active virtual machine image components are transmitted to the selected secondary backend computing device; and updating, in the selected secondary backend computing device, the at least one replica of the first virtual machine with the new active virtual machine image components, thereby replicating the second virtual machine image in the selected secondary backend computing device.

In another embodiment, a computer-implemented system of automatically replicating virtual machines across wide area networks, the method comprising: selecting, from a plurality of secondary backend computing device, at least one secondary backend computing device for storing at least one replica of the first virtual machine for physical hosting of the first virtual machine image; monitoring, in a primary backend computing device, the first virtual machine image for any updates, where the update to the first virtual machine image creates a second virtual machine image; partitioning, in the primary backend computing device, the first virtual machine image into a set of first virtual machine image components, and the second virtual machine image into a set of second virtual machine image components; indexing, in the primary backend computing device, the first set of virtual machine image components into an index of stale virtual machine image components, and the second set of virtual machine image components into an index of active virtual machine image components; comparing, in the primary backend computing device, the set of active virtual machine image components to the set of stale virtual machine components to identify new active virtual machine image components, where the new active virtual machine image components are transmitted to the selected secondary backend computing device; and updating, in the selected secondary backend computing device, the at least one replica of the first virtual machine with the new active virtual machine image components, thereby replicating the second virtual machine image in the selected secondary backend computing device.

BRIEF DESCRIPTION OF THE DRAWINGS

The accompanying drawings constitute a part of this specification and illustrate an embodiment of the invention, and together with the specification, explain the invention.

DETAILED DESCRIPTION

Figure 1:
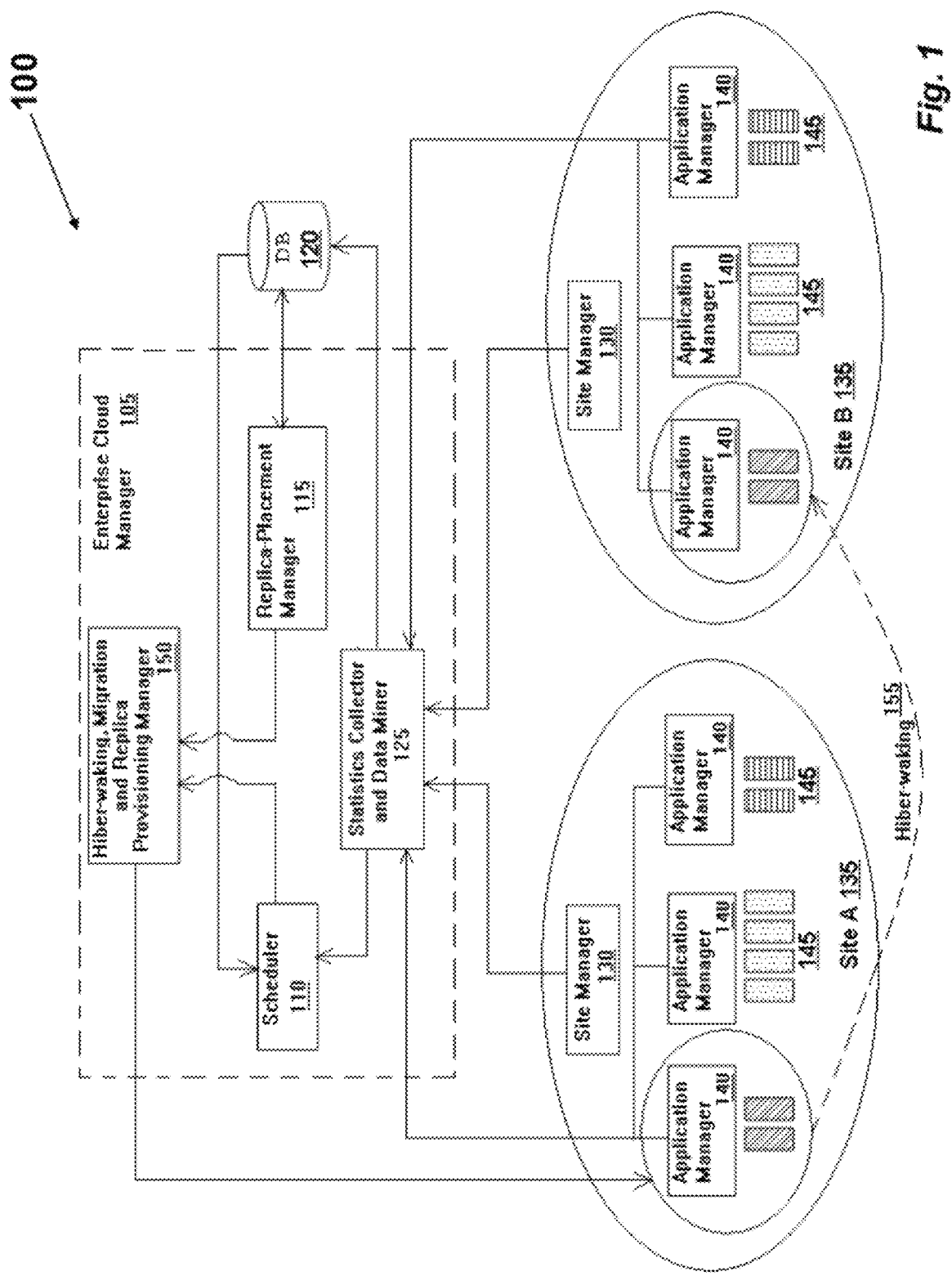
FIG. 1 illustrates a system for replicating VM images for multiple secondary VM storage cloud sites according to an exemplary embodiment.

Reference will now be made in detail to the preferred embodiments, examples of which are illustrated in the accompanying drawings.

Virtual machines are widely used in cloud computing applications, where the actual physical machine running the VM software is located in different locations. While virtual machine image files store much of the status information along with data related to current application and OS in implementation, other image files can be used exclusively for data storage. The term 'image files' is used interchangeably with the term 'images' in this disclosure, both describing a file comprising virtual machine data. Database image files can be accessed by the image files for the database information pertaining to a "live" VM. As such, if the VM image has multiple data image files, then the database image file, the virtual machine image file, and any other related image files should be replicated. Remote storage of live VMs across high latency, low bandwidth wide area networks (WAN) results in lags and hardware trailing issues that are visible to a client computer accessing the VM. Further, the process of replicating a live VM involves storing the entire state of the VM from a primary remote machine to multiple secondary storage machines. Multiple storage machines are updated with new data from the end-user of the live VM without any data loss or continuity disruptions to the end-user client computer. The replication method and systems described herein are motivated by various factors, including the price of storage devices, redundancy of the virtual machine image data, and limited network bandwidth at the secondary VM locations.

In an exemplary embodiment, to determine multiple eligible sites for replication of the VM image, operating parameters and its values are analyzed by a VM management software application comprising software-based sub-modules for managing replica placement. Software modules and sub-modules are software codes that render independently or within a large software program, and are used interchangeably in this disclosure. Exemplary operating parameters include, the average access costs; perceived latency for the VMs hosted at different cloud sites; available network bandwidth; heat generated; number of access users allowed; cost of resources; memory capacity (e.g., random access memory, read only memory, and read and write memory); and network congestion among the different sites. Further, the long-term costs associated with inter-site and intra-site variations are also analyzed for replica placement. In another embodiment for determining inter-site and intra-site variations, the commonality of different VM images are compared, where the different VMs are stored in different physical machines within the same cloud site (intra-site), or different physical machines in different cloud sites (inter-site). It is further appreciated that an existing VM image at one destination site is compared with the VM image to be replicated to find similarities, thereby enabling the VM management software to determine if the destination site is suited for the VM image replica. Comparison methods can be automated using software to compare virtual machine image metadata of the existing VM against the VM to be replicated. Further, size variations, transmission speeds, and costs of maintaining and operating physical machines at a destination site are analyzed for the existing VM at the destination site, prior to selection and replica placement.

In another exemplary embodiment, the replication of virtual machine image files and its associated image files (e.g., data image file, etc.) across multiple secondary VM sites is implemented by a VM management software application resident on a networked backend computing device. The VM software application monitors a VM image file resident at a primary site, and being used by a VM end-user on an end-user client computing device. When the end-user makes any updates within the VM environment on the client computing device, the changes generate new data in the VM image file at the primary location. The VM management software application uses this new data to update the replica VM images at each secondary site. The replication methods described herein incorporates exemplary processes for efficient replication, and propagation of updates including write coalescing and data compression methods.

In another exemplary embodiment, a de-duplication or removal of duplicate information among multiple replicas is implemented between the secondary replicas at each secondary site. This process reduces cost of storage of multiple replicas in different secondary VM sites. The de-duplication method described herein, in an exemplary embodiment, implements either variable sized chunking technique, also called content based redundancy (CBR) elimination technique using sliding window hashes in the form of Rabin fingerprints or fixed size chunking technique to find and eliminate redundant data. It is further appreciated that propagation of updates to a primary VM image file and de-duplication can be effected in a single software module. In this case, when update propagation and de-duplication are combined, CBR based on Rabin fingerprints and/or fixed size chunking is first implemented to de-duplicate the replicated secondary image files and create hash indices to verify updates to a primary VM image file, while write-coalescing and compression methods are used to propagate updates from the primary VM image file to secondary replica image files. Alternatively, update propagation can utilize the CBR and/or hash indices produced as a result of the de-duplication process to identify the need for propagation of primary VM image file updates prior to applying write-coalescing and compression methods for actual propagation.

In another exemplary embodiment, de-duplication ratios derived form the CBR methods are used to determine the state of secondary replicas (e.g., amount of redundancy in image data). The state of the secondary replicas enable the VM management software application to replicate non-redundant chunks of data by comparing hash indices of stale and updated VM image files during initial replica placement. The non-redundant data chunks may represent the updates to the primary VM image file, where the updates generated by an end-user, and where the updates are replicated using the write-coalescing and compression methods to conserve network bandwidth and enable faster transfer of updated portions of VM image data to remote sites. De-duplication ratio is a measure of the size of the common content between two different VM image files. A combined or separate implementation of update propagation and/or de-duplication method can be initiated at any time, and between any set time period according to a pre-defined scheduled times. The granularity of the scheduling can be in the order of several hours. Multiple scheduling periods can be arranged for automated replication of the changed data blocks to the secondary sites. In one example, for replication on a separate replication and de-duplication implementation, a replication placement manager module analyzes data collected from previous replications in different cloud sites by a statistics collector module. The data is used to determine a new location for a new replica placement. Further, during scheduling of primary and secondary VM images and site locations, a single replication (replica placement) horizon period comprising multiple replication scheduling periods is defined. An exemplary replication horizon period is about a month in granularity, while exemplary scheduling periods are hours, days, or even minutes. Each period can also comprise one primary VM image and multiple secondary VM images on which de-duplication and replication functions are implemented. Each replication horizon period signals the end of the replication schedule and the start of a de-duplication cycle to remove redundancy among the replicas used in the first cycle, before the next replication horizon begins. It is appreciated that propagation of the incremental changes from one primary replica to secondary replica is interchangeably used with replica placement in the standard literature, and in this disclosure. Update propagation happens in intervals of few seconds. A person skilled in the art will recognize from the context being described that replication is used for either placement of whole VM images at different sites (i.e. replica placement) or propagation of the incremental updates from the primary VM image to the secondary VM images (i.e. update propagation).

In yet another exemplary embodiment, the methods and systems described here enable migration of live VM images across wide area networks. In order to limit the disruption or noticeable effects to the end-user client when migrating live VM images, it is beneficial to ensure that network TCP (transmission control protocol) survives the VM migration process. Further, applications encapsulated with the VMs should see no disruptions in network connection even across multiple networks (outside the sub-net of a local network). The methods described herein allows a VM management software to manage the migration of large virtual machine image files across networks without consuming excessive network bandwidth, and network time. To minimize bandwidth, and network time, the exemplary methods described herein implements hash comparisons to find data differences between replicas at remote cloud sites after which, incremental updates are applied to replicas in remote cloud sites with only the updated data sections, and not the entire image file. Finally, any data file that is being accessed by a VM image file should be seamlessly linked to the migrated VM image. The data file might be a database file of all application data belonging to a client user of the VM image, where the data file is stored in a storage area network (SAN). It is further appreciated that data image files associated with VM image files are also stored as multiple replicas in multiple locations, each replica capable of being de-duplicated and replicated at scheduled times.

In one exemplary embodiment for managing latencies during the transfer of large data volumes across wide area networks, a VM replication and VM scheduling process is implemented by the VM management software application in a backend computing device. The VM replication process identifies remote cloud sites and intra-cloud physical VMs to store replicas of the VM image from a primary VM site. These secondary VM cloud sites are identified by reviewing the operating parameters and values of each cloud site and of similar VM images, if an existent VM image is of similar size, capabilities, and functions as an intended primary VM image. Operating parameters include long-term average cost of computation of every VM at each of the candidate cloud sites during different time-periods and the end-user latency requirements associated with the intended primary VM. Such sites are classified to meet the end-user latency requirements and are eligible for replica placement.

In another exemplary embodiment, the methods and systems described herein includes prioritization processes within a scheduling software module of the VM management software application. In the case of multiple secondary sites for storing replicas, one of the secondary sites is assigned as a high priority backup for disaster management. This enables the prioritization processes to follow a priority schedule for initial replication of new data from VM image files to a selected secondary replica VM image at a selected disaster recovery secondary site, and subsequently, to other secondary sites of lower priority. If the disaster management secondary site encounters a problem and fails, then the VM management software application can assign responsibility to a different secondary site by changing the priority on an existing secondary site to a high priority disaster management secondary site.

In another exemplary embodiment, migration of a live VM image is implemented by the VM software application using computer coded instructions to move a VM image to a remote cloud site that does not have a replica of the VM image. Another exemplary implementation, using the VM software application, incorporates a hiber-waking method. In this method, a replica VM image at a destination cloud site is transitioned to an active state from a previously passive (hibernated) state, and becomes the primary VM image, while the previously active VM image at the source cloud site is re-designated as a replica VM image. One requirement in the hiber-waking method is for the active VM image at a source site to be hibernated prior to designation as a replica VM image, while the replica VM image at a destination site is awakened from its hibernation state, and is re-designated as the active VM image.

An Enterprise Cloud Manager (ECM) software module can be deployed on a centralized backend computing device as the VM management software application to monitor the interactions of multiple VMs from the secondary sites. A statistics collector (SC) sub-module of the ECM software module collects statistics and mines for data from site managers (SM) software modules located at each secondary site. The SC module then presents this data to a replica placement manager sub-module (RPM) within the ECM. The SM is responsible for VM placement and scheduling at the local site. The site manager also monitors optimal conditions defined to meet performance objectives which are pre-defined for each site. The determination of a site objective can be set through the ECM based on such factors, as the hardware, network and software of the remote secondary site. By way of an example, an objective set by one site manager at one site for the optimization of VM storage at the site is minimization of overall energy consumption at the site.

Each VM also comprises an application manager (AM), which interacts with the SM at each secondary site. The AM monitors the application behavior and ensures that the BMs are allocated sufficient computing resources so that the service level objectives (SLO) as defined by a service level agreement (SLA) are not violated. The SLA can be defined between a company, which wishes to deploy cloud computing capabilities for its business, and the cloud computing service providers. Further, much of the monitoring of the AM software module can be implemented automatically. This is enabled by converting the SLA into computer-coded business rules that can be implemented by a software module to monitor current usage, and trigger alarms if pre-defined limits are violated.

The RPM sub-module determines the number of replicas and their site locations after considering the de-duplication ratios and long-term average cost provided by the statistics collector (SC) sub-module. De-duplication is a process of removing redundant data from multiple replicas using mathematical methods. De-duplication can be implemented on multiple replicas at pre-designated time schedules to reduce the amount of data stored between secondary VM sites. In an exemplary embodiment, a de-duplication method comprises reduction of each replica using the mathematical model in equation (1).

$$l_{ijt} = \frac{F}{C_t} + \frac{I}{1 - \lambda_t I} + \frac{F}{S_{jt} - \lambda_t F} + \frac{F(B + \mu Y)}{B\mu - \lambda_t F(B + \mu Y)} \quad (1)$$

$l_{ijt}$ : Expected latency when image $i$ is hosted on site $j$ at time $t$

Where, in equation (1), F is the average file size, $C_t$ indicates the client network bandwidth at time t, I signifies the initialization time, $\lambda_t$ denotes the network arrival rate at time t, $S_{jt}$ denotes the server network bandwidth of site j at time t, B indicates the buffer size, $\mu$ represents the dynamic server rate and Y represents the static server time. Further, the costs involved with storing and operating a primary copy of the VM image at site j can be derived using equation (2).

$$\min \sum_j \sum_t \overline{C}_{jt} \sum_i Z_{ijt} + \sum_j C'_j \sum_k Y_{kj} \, size_k \quad (2)$$

In equation (2), i is an identifier for a VM image i∈I; k is an identifier for chunks of the VM image k∈K; j is an identifier for VM image j∈J; $K_i$ is the set of chunks for VM image i; $size_k$ is the size of the $k^{th}$ chunk of the VM image; $\overline{C}_{jt}$ is the operational cost of hosting at site j during time t, and $C'_j$ is the per unit cost of storage at site j. $Y_{kj}$ has a value of 1, if the chunk k is stored at site j, otherwise $Y_{kj}$ is 0. Similarly, $z_{ijt}$ is 1 if the replica of the VM image i at site j is the primary copy at time t otherwise $Y_{kj}$ is 0.

Equation (2) is further subject to the conditions of equation (3), equation (4), equation (5), and equation (6) below.

$$1 \le \sum_j X_{ij} \le N_i^{max} \; \forall \, i \quad (3)$$

$$Y_{kj} \ge X_{ij} \; \forall \, i, j, k \in K_i \quad (4)$$

$$X_{ij} \ge Z_{ijt} \; \forall \, i, j, t \quad (5)$$

$$Z_{ijt} l_{ijt} \le l_i^{max} \; \forall \, i, j, t \quad (6)$$

Where $A_k$ is the number of VM images where chunk k occurs, $N_i^{min}$ is the minimum number of replicas of VM image i; $N_i^{max}$ is the maximum number of replicas of VM image i; $l_i^{max}$ is the maximum acceptable latency for VM image i; and $X_{ij}$ is 1 if a replica of the VM image i is placed at site j, else $X_{ij}$ is 0.

However, equation (1) is computationally large for a moderate cardinality of the set K. A greedy heuristic approach is used to resolve equation (1) for determining the sites for replica placement. Assuming a set, $D_{ii'}$, as the result of a de-duplicating pair of VM images, i and i', a high value of $d_{ii'}$, where $d_{ii'} \in D_{ii'}$, indicates that the VM images i and i' share a significant proportion of their content. Further, $d_{ii'}$ is expressed as a percentage, and is calculated as a ratio of the size of the common content to the total size of the content of i or i', whichever is maximum. The objective of this calculation is to create an algorithm to detect sites with complimentary cost structures ($\overline{C}_{jt}$). As a result, if j and j' are two sites with complimentary cost patters $\overline{C}_{jt}$ and $\overline{C}_{j't}$, and if $\overline{C}_{j't} > \overline{C}_{jt}$, the cost of maintaining only one replica at site j' is equivalent to the cost of operating VM image i during time t at site j', as against the cost of maintaining two replicas at site j and j'. In this case, the cost of maintaining two replicas includes the additional storage requirement as a consequence of having a replica at site j.

Using the exemplary equations for latency calculation (equation (1)) and cost comparison (equation (2)), an exemplary algorithm can calculate latency issues and profitability of reserving multiple replicas at different sites or instead, maintaining fewer replicas at the expense of a higher cost operation. This algorithm is software coded into the RPM sub-module and is implemented at various times using data collected by the SC sub-module. The scheduler sub-module interacts with the RPM, to trigger the RPM into ensuring that the current costs and latencies are within acceptable limits as defined in an SLA or following the profitability objectives of the cloud service provider. The SLA business rules can be computer-coded to data comparison algorithms to ensure that the SLA or profitability requirements are maintained at all times. This comparison can be implemented in the enterprise cloud manager (ECM), with full accessibility to the cloud service provider (target VM machine administrators) and limited accessibility to the cloud client (client VM machines).

An exemplary algorithm for calculating latency and costs for the RPM utilizes two phases—a distribution phase, and a consolidation phase. At the distribution phase, a set of sites ($J_1$ ∈J) is identified that adheres to the latency requirements for VM $i_1$ and another set of sites ($J_2$∈J) is identified that adheres to the latency requirements of VM $i_2$. The members that are common to the sets $J_1$ and $J_2$ fulfill the latency requirements for virtual machines, $i_1$ and $i_2$. If there are common members (if $J_1 \cap J_2$ is NOT null), then the replicas of the VMs $i_1$ and $i_2$ are placed at sites $j \in J_1 \cap J_2$, and the algorithm proceeds to the next iteration. However, if there are no common members (if $J_1 \cap J_2$ is null), then there are no replicas for placement, and the algorithm proceeds to the next iteration. In a set where $d_{ii'}$ is initialized to $\max_{ii'}\{D_{ii'}\}$; $i=i_1$, $i'=i_2$, for subsequent iterations of i, the next best value is chosen among the remaining values within set $D_{ii'}$. The remaining values are assigned to $d_{ii'}$. The iterations are continued for as long as $d_{ii'}$ is greater than a user defined threshold. The result of this phase are $I_j$, the set of VM images at site j, $K_j$, the set of unique chunks at site j, and $R_i$, the set of replicas of VM image i.

In the next phase of the algorithm, the consolidation phase, the distribution phase results are consolidated to reduce the number of replicas generated. For each site j, the savings in storage spaces as a consequence of the de-duplicating of set $I_j$ is calculated. With $r_{ij} \to I_j \times R_i$ and $Sav_j$ is the space saving due to de-duplication of the $I_j$ images at site j, the contribution made by each replica is calculated as a ratio of the space savings (Sav j) generated when the replica is part of the $I_j$, as disclosed in equation (7) and the space savings ($Sav_{r_{ij}}$) calculated when replica is left out of the set $I_j$, as illustrated in equation (8).

$$Sav_j = \Sigma_i \in I_i \Sigma_k \in k_i size_k - \Sigma k \in k_i^{size}{}_k \quad (7)$$

$$Sav_{r_{ij}} = \Sigma(i' \in I_i \& i' \neq i)\Sigma(k \in k_i)^{size}{}_k - \Sigma(k \in k_i \cap k_i \& i' \neq i)^{size}{}_k \quad (8)$$

The ratio between equation (7) and equation (8) is calculated for each VM image i in li, and then for each site j in J. Further, with $\bar{r}_{ij} = \arg\min_{irj}(Sav_j/Sav_{r_{ij}})$ and $\bar{r}_{ij}$ to as a member of set $Ri'$, if $|R_i'| > N_i^{max}$, then the replica $r_{ij}$ is removed and $Sav_j$ and $Sav_{r_{ij}}$, i in $I_j$, and $I_j$ are updated. This calculation for $r_{ij}$ is performed until all the replicas for all the VM images are within the bounds $N_i^{max}$.

Finally, the exemplary algorithm detects the sites where cost structures ($\bar{C}_{jt}$) vary in a similar manner to latency structures. For the VM images with multiple replicas at sites with cost structures enforced, the algorithm calculates whether it is profitable to maintain multiple replicas these sites. In one example, this is implemented by monitoring any decreases in costs for storage cost if the replica of the VM image i is deleted from the site. An absence of a cost benefit will leave the image on the site, but will delete it for a cost benefit. In an exemplary method of implementing cost benefit measures, the ratio of the marginal decrease in cost due to de-duplication when a VM image i is retained at a site, and the marginal decrease in cost due to de-duplication when the VM image is deleted from the site is measured. The VM image with the lowest ratio is considered for deletion, subject to the fulfillment of the other constraints disclosed herein, such as cost of maintaining the VM image at each secondary site.

FIG. 1 illustrates of an exemplary embodiment of a method and system for replication of VM images across wide area networks (WAN). An enterprise cloud manager (ECM) 105 software module functions as a VM management software application on a backend computing device to monitor and manage the primary and replica images on remote cloud sites. The ECM can be accessed via a browser or a stand-alone web-enabled software application. While complete control of the sub-module elements of the ECM is extended to the cloud computing service provider hosting the entire method and system 100, partial control is designate to client computing devices. Alternatively, a parent software application is implemented to control the ECM, when the parent application implements business rules defined in a service level agreement (SLA) between the cloud computing service provider and the client computing devices. Computing devices as related to the systems and methods described herein include personal computers (PC), netbooks, laptops, servers, smart phones, and any device with a processor and memory capable of networking.

The ECM 105 comprises a scheduler 110 software sub-module, a replica placement manager 115 sub-module and a statistics collector and data miner 125 sub-module. Each of these sub-modules is connected to a database server 120, where the database server can be a remote server with networking capability. Each cloud site location 135 is a geographically disparate location with multiple backend computing devices 145, where each device is managed by an application manager 140. The remote sites 135 are managed by site managers 130, which are connected through a data network to a central ECM software at the location of the cloud computing service provider.

The site manager (SM) 130 is a monitoring and enforcement tool that is responsible for VM placement and implementing scheduling decisions sent from the ECM. The SM 130 monitors operating parameters and its values, such as, the network bandwidth, CPU (processing) availability, memory capacity, power usage, among other computing metrics and transfers these metrics to the statistics collector (SC) 125. The SM 130 also provides the SC 125 with site specific inputs, for example, the per unit storage costs, and the per unit cost of computation at different time intervals. The SM 130 also incorporates a de-duplication module for identifying duplicate data blocks for the VM images stored in a centralized shared repository within the cloud site. It is appreciated that if de-duplication and replication (for update propagation) are combined within the SM module at an exemplary primary VM site A 135, then the replication function (or sub-module) within the SM module implements write-coalescing and compression methods over the hash indices maintained by the de-duplication module to transmit non-redundant (new de-duplicated) data of the primary VM image to the secondary VM image replica files. This non-redundant data can then be transmitted to another secondary replica site B 135 chosen earlier by the RPM 115. However, if the SM module incorporates only the de-duplication methods disclosed herein, then the hash index of de-duplication information is presented to the RPM 115 via the SC 125 by the SM module; the RPM determines a replica site, while the hiber-waking and replica provisioning manager 150 via the replication function 720 performs the propagation of the non-redundant data updates to the secondary replicas using compression and write coalescing methods of the replication function (or sub-module). A storage area network (SAN) is an example of a centralized shared repository. The meta-data associated with the data blocks, for example, a hash value of the data contents, and the number VM images are also communicated to the SC module. Additionally, the percentage of similarity between VM images are calculated from the data blocks within the SM. This statistic is also transferred to the SC, where all the data is collated over several scheduling cycles and long-term averages to calculate the operations costs and access costs.

The RPM (replica placement manager) 115, periodically communicates with the SC, and uses the statistics collated to resolve any replica placement issues. In a first run of the system, a virtual machine image and associated data image files of a VM are created for a client and stored in a primary cloud site, in a primary VM device. The access to these files is determined in an SLA and further information on the users is maintained in a user directory. The SLA also defines the extent of support and backup provided to the client. In view of the SLA, the number of secondary cloud sites and secondary VM devices, as well as the locations and costs are determined and the VM image and associated image files are replicated to these secondary VM devices.

The RPM 115 and scheduler 110 communicates with other modules within the ECM to transmit solutions to any issues developed when the SC data is reviewed. A hiber-waking, migration and replica provisioning manager module 150 analyzes the solution from the scheduler 110, and along with input from the RPM 115, implements a VM image at a different site, by either hiber-waking 155 or live migration depending on the state of the current live VM image. In the live migration process, according to an exemplary implementation, the primary VM image is replicated at a secondary site, where the secondary site did not have a copy of the primary VM image file to begin with. In a hiber-waking method, an up-to-date secondary VM image is activated as primary (awakened), while the primary VM image is hibernated (de-activated or re-designated) as secondary VM image. A solution of live migration or hiber-waking is provided if there is a determination from the SC that the current cloud site or the physical VM hosting device is deemed to have issues, for example, high costs or latencies that were previously non-existent. The information on the location of replicas are maintained in a centralized database, e.g., database 120, and are available to the hiber-waking, migration and replica provisioning manager module 150, and the ECM 105. Sub-modules 150 and 105 make the list of replicas and information regarding location of the replicas available for review by a system administrator for reference or manual control of the replicas.

In an exemplary embodiment, the scheduler 110 can be either time-based or event-based or both. In the case that the scheduler is event-based, the scheduler module generates VM scheduling decisions based on event notification from the SM 130, by way of the scheduler 110. As an example, if an SM indicates that operations costs are increasing, and the SC 125 has provided this information to the scheduler 110. The scheduler 110, in turn, notifies the hiber-waking manager 150 that a VM images can be moved or activated at a different location and removed ore deactivated from the current location. The hiber-waking, migration and replica provisioning manager module 150 performs a hiber-waking or a live migration process to move a primary VM site to a secondary VM site on the same or a different cloud site. The live migration implementation involves copying the current VM image to a secondary VM site, where the secondary VM site does not have an existing and up-to-date replica of the current VM image. The current VM image at the secondary VM site is then activated the primary VM image. The hiber-waking implementation activates (or wakes) a hibernated replica at the secondary (or destination) VM site, while de-activating (or hibernating) the previously active primary VM image at the primary (or source) VM site. The type of scheduling where the RPM acts on an event is referred to herein as reactive scheduling. The provisioning of VM images across VM sites can be implemented within a cloud site, from one physical VM computing device to another. Such inter-cloud creation and deletion of VM images is implemented if the computing capability of one VM computing devices reaches a pre-determined threshold. The newly designated replica VM image (previously the primary VM image) will be in hibernation and will be updated with new data from the primary VM image. The replica VM image does not perform any live services. As such, the operational costs are at minimum to retain the replica this previously live cloud site.

The scheduler 110 can also implement scheduling based on time-sensitive strategies, where the module 110 proactively seeks and selects cloud sites and VM devices within cloud sites for replica VM image placement. The RPM can be invoked with a granularity period in the order of months. Once a feasible solution to a replica placement problem is known at the beginning of replication (for replica placement) period, the number of replicas and locations of the replicas remain fixed till the beginning of the next replication (for replica placement) interval. Each interval consists of a number of scheduling periods.

Figure 2:
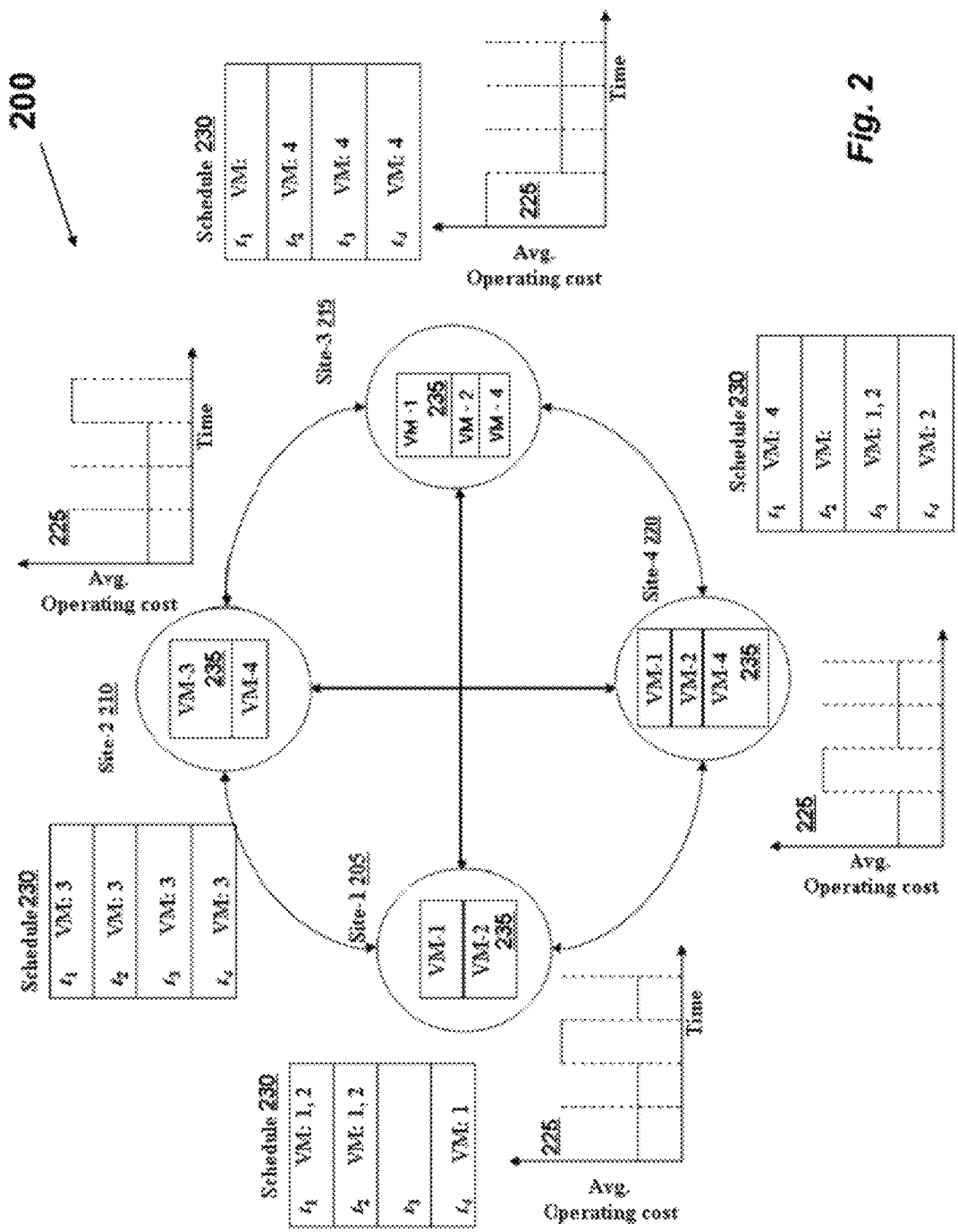
FIG. 2 illustrates a system and method for scheduling and provisioning VM images across multiple secondary cloud sites based on the operating parameters of the secondary cloud sites according to an exemplary embodiment.

FIG. 2 illustrates the provisioning of VM images on different cloud sites at different time intervals depending on the operating parameters over a time period. Sites 1, 2, 3 and 4 (204, 210, 215 and 220) are remote cloud sites in different locations. In the exemplary implementation in FIG. 2, a primary VM image, VM-1, can be stored in site 1 205. The replica VM images for VM-1, are stored in site 3 215 and site 4 220. The sites are chosen by their availability in terms of the operating costs per the schedule. Further, the latency in the network access to the different sites indicates that a primary VM image would be better represented from a different site. The operating costs at time $t_1$ and $t_2$ are low for site 1, and therefore, site 1 can be implemented ahead of the other sites. However, at time $t_3$, when the costs are higher at site 1, the scheduler indicates to the hiber-waking, migration and replica provisioning manager module 150 to select a new site, deactivate or delete the old replica VM image, and transfer control of the primary VM image to the new or activated replica VM image.

For storage of VM images across multiple secondary VM devices in secondary cloud sites, the percentage of similarity of the VM images is used to update the replica VM image without having to copy the entire VM image over. Table 1 illustrates the percentage of similarity between a pair of VM images from FIG. 2. The percentage of similarity is at 70 for VM-2, which implies that the de-duplication will remove the duplicate data blocks from the primary VM image on site-1 205, while the replication module updates sites 2 and 3 (215, and 220) with the non-redundant data blocks. The algorithms discussed above to check for redundancy and to de-duplicate data blocks will be implemented at this stage.

TABLE 1

|      | VM-1 | VM-2 | VM-3 | VM-4 |
|------|------|------|------|------|
| VM-1 | NA   | 70   | 30   | 60   |
| VM-2 | 70   | NA   | 20   | 50   |
| VM-3 | 30   | 20   | NA   | 70   |
| VM-4 | 60   | 50   | 70   | NA   |

Table 2 lists the perceived end-user latencies when the VMs operate from different sites as illustrated in FIG. 2. This information table illustrates one of the operating parameters (latency) and its associated values, which are used to choose a secondary VM cloud site. Further, in another exemplary embodiment, if the VM image data is similar to an unrelated third VM image data, then the operating parameter values of the third VM image data is utilized to find a site for the intended VM image data replica. The similarities of the intended VM image data and the third unrelated VM image data can extend to comparison of the third VM image data latencies, size of the VM image data, the network bandwidth, power consumption, number of users allowed, among other parameters.

TABLE 2

|       | Site-1 | Site-2 | Site-3 | Site-4 |
|-------|--------|--------|--------|--------|
| VM-1  | 4      | 8      | 3      | 2      |
| VM-2  | 3      | 2      | 4      | 2      |
| VM-3  | 2      | 3      | 6      | 7      |
| VM-4  | 8      | 4      | 3      | 2      |

The latency rules are followed according to the combination set by Table 2, and illustrated in FIG. 2, where, the following combinations are never implemented because of high latency, i.e., $VM_4$ at $Site_1$, $VM_1$ at site-$S_2$, $VM_3$ at sites-$S_3$ and $S_4$. However, $VM_1$ at $Site_1$, $Site_3$ and $Site_4$ are eligible combinations having reasonable latency values approved by a client in, for instance an SLA. Similarly, eligible sites for $VM_2$, $VM_3$ and $VM_4$ can be determined. Further, using data from Table 1 and Table 2, the virtual machines VMs—VA, $VM_2$ and $VM_3$ can have a replica each at site, $S_1$. However, because content commonality between the pairs—$VM_3$:$VM_1$ and $VM_3$:$VM_2$ is not high, the cost of maintaining only one replica—an instance of $VM_3$ at $S_2$ is compared against the cost of additional storage due to two replicas—one instance of $VM_3$ at $S_2$ and a new instance of $VM_3$ at $S_1$. In case of the only instance of $VM_3$ at $S_2$, $VM_3$ will be operational during all the scheduling periods, $t_1$ to $t_4$, as illustrated in FIG. 2 at site 2 210. To overcome the high operation cost at $t_4$ of $VM_3$, $VM_3$ can be implemented at $S_1$; the new instance of $VM_3$ at $S_1$ 205 is scheduled for execution only during time-slot $t_4$, as illustrated in element 230 of site 1 205. As a result, the instance of $VM_3$ at $S_2$ is scheduled for execution during periods, $t_1$ to $t_3$. When the cost of additional storage due to $VM_3$ at $S_1$ is more than the operating cost of $VM_3$ at $S_2$ during scheduling period $t_4$, it suffices to have only one replica of $VM_3$ (at $S_2$). Similarly, VMs—$VM_2$, $VM_3$ and $VM_4$ are candidates for $S_2$. However, since $VM_2$ has little in common with $VM_3$ and $VM_4$ and if we assume that $VM_2$ has replicas at $S_3$ and $S_4$, we decide not to replicate $VM_2$ at $S_2$. The final placement of the replicas for the virtual machine files belonging to the four VMs is shown in FIG. 2. The scheduler 110 in FIG. 1 now draws a schedule for executing the VMs (this involves choosing one of the replicas of a VM as a primary copy) at the four sites in a manner that either balances the load equitably across the different cloud sites or optimizes a cost function.

When the scheduler determines that load balancing across clouds is a priority (e.g. a step-wise cost function as shown in the FIG. 2), the scheduler will schedule execution of $VM_3$ at $S_2$ and of $VM_4$ at $S_3$ during time slots $t_2$, $t_3$, $t_4$ and schedule execution of $VM_4$ at $S_4$ during time-slot $t_1$. Similarly, the scheduler schedules execution of $VM_2$ at $S_4$ and $VM_1$ at $S_1$ during time-slot $t_4$. However, if the objective is to minimize the number of inter-cloud migrations (e.g., due to reasons related to performance), then the scheduler schedules execution of $VM_1$ at $S_4$ during time-slot $t_4$.

Figure 3:
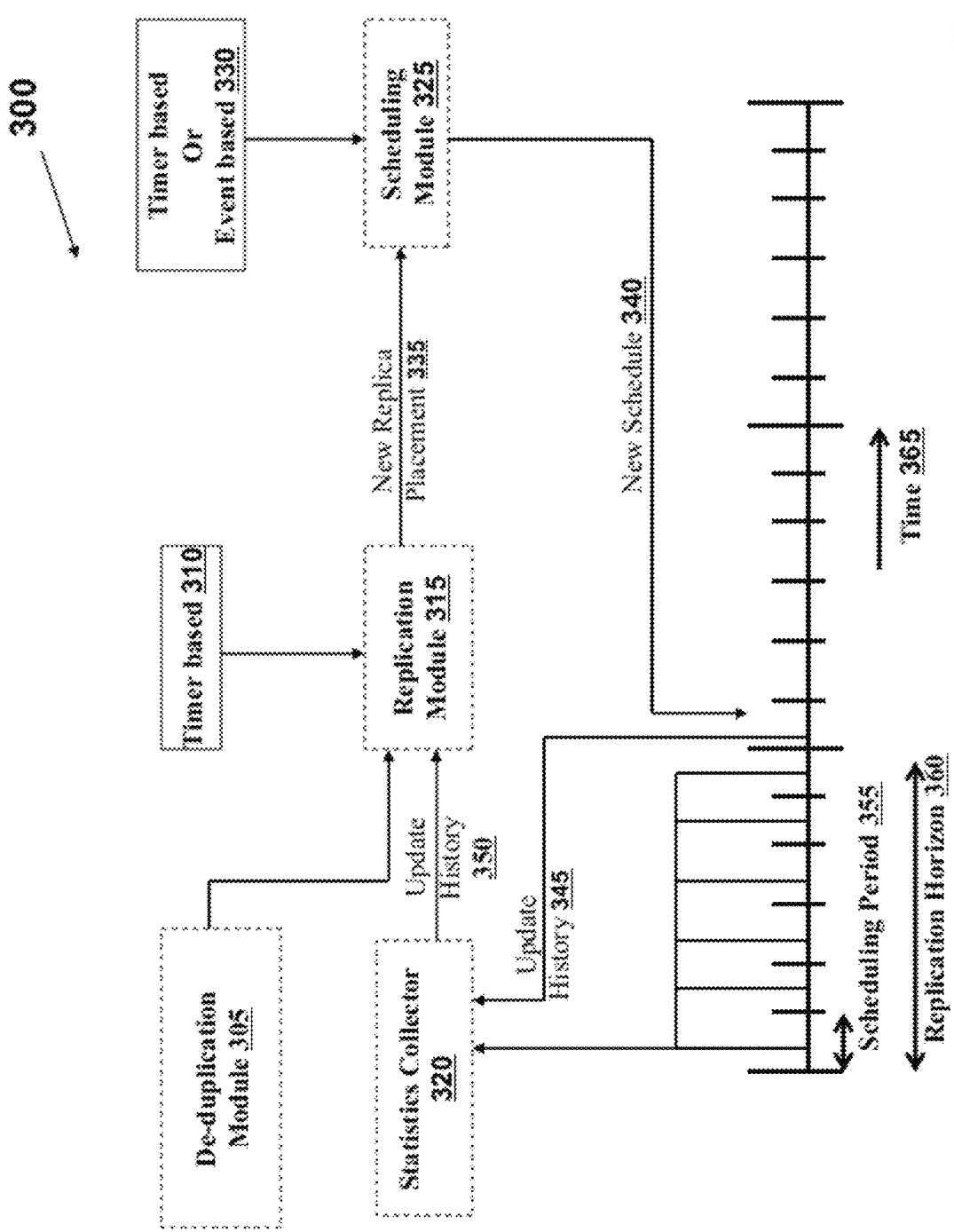
FIG. 3 illustrates a method of de-duplication and scheduling updates on replica VM images according to an exemplary embodiment.

FIG. 3 illustrates the scheduling process implemented according to an exemplary embodiment. The scheduling period 355 indicates the periods when data is collected by the SC 320. The replication horizon 360, for replica placement, occurs every few scheduling cycles and indicates when the replica is updated, and when the de-duplication of the replicas is initiated. The replication horizon 360 is also called the replica placement horizon. The scheduling periods are encapsulated by a replication horizon over pre-determined time periods. If the replication and de-duplication processes are combined into a single SM module for the purposes of incremental update propagation, then the replication (used here to describe incremental update propagation) is initiated based on the schedule by analyzing the hash index of each SM at the primary site and the replica sites. The SM module is then capable of de-duplicating and propagating the new data chucks to the various secondary replicas in the secondary sites. However, if the SM module only tracks the hash index via the de-duplication module 305, while the de-duplicated data is sent to the replication function 720 of FIG. 7 for propagation to the secondary replicas. Further, it is appreciated that the replication module 315 can be limited to decisions on the placement of the replicas, and is, therefore, the same as the replica placement manager 115 in FIG. 1, but is different from the replication function 720 in FIG. 7, which serves to propagate the incremental updates from the primary replica to the secondary replicas using different write coalescing and compression techniques. In this example, only the changes made from the start of the last update to the current update in the primary VM image is allowed for replication by the de-duplication module 305. As a result, the de-duplicated data blocks are placed at the appropriate secondary VM sites. A scheduling module 325 logs the update to the old replica and implements a new schedule 340 for selection of a new primary VM image. This is an illustration of time based selection of primary VM image from amongst the replicas of a VM image according to an exemplary embodiment. The timer or event module 330 might, alternatively, trigger a schedule event to be implemented via the scheduling module 325. Scheduling periods occurs over intervals in the order of hours, while replication (for placement of VM image replicas) horizons occurs in the order of days or even months. Further, propagation of the incremental updates from one primary replica to secondary replica happens in intervals of few seconds. A person skilled in the art will be able to recognize from the context being described that 'replication' is used to either describe placement of whole VM images at different sites or propagation of the incremental updates from the primary VM image to the secondary VM images.

In an exemplary embodiment for placement of initial replicas 335 of a primary VM image, an event driven or time driven replication is initiated by the replication module 315 for replica placement. The statistics collected in the SC module 320 during different scheduling periods (or previous replication horizons) is used to determine initial replica placement for the next replication horizon 360 at a subsequent time 365 in a pre-determined schedule. The combination of replication and scheduling in conjunction with content-based hashing for duplicate identification and storage mirroring is used to minimize the network latencies while placing an initial VM image replica in a remote VM cloud site. The granularity in the case for initial replica placement is of the order of weeks or months. However, the granularity for update propagation will be of the order of minutes/seconds or even sub-seconds.

Figure 4:
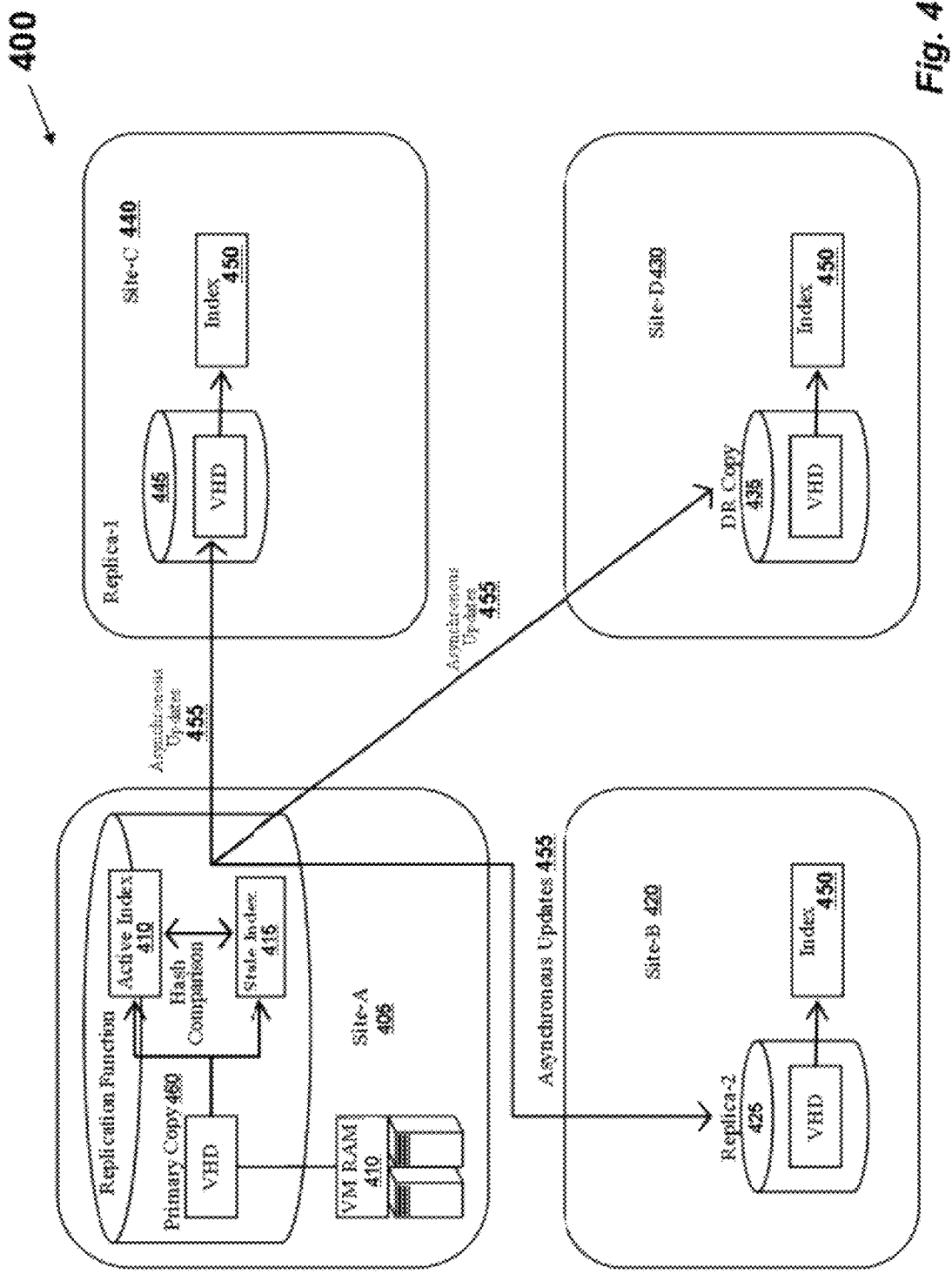
FIG. 4 illustrates a system of checking for VM image data updates according to an exemplary embodiment.

FIG. 4 illustrates a system and method according to an exemplary embodiment of updating VM images efficiently in a WAN by implementing a hash comparison between active index 410 and stale index 415 at the primary VM backend computing device. The primary image copy 460 is broken down in constituent data blocks which are stored as hash objects for comparison. Hash comparison using Rabin fingerprints is implemented between the active and stale indices to identify any update to the image data files at the primary cloud site 405. At scheduled intervals, the indices are compared and asynchronous updates are applied to chosen replicas at different secondary cloud sites 440, 430 and 420 using only the new data blocks. The index 450 in each secondary cloud site is updated to indicate when the replica VM image was updated and with index data on the new data block. In an exemplary embodiment, one of the secondary cloud sites can be used as a permanent backup site from which the primary VM image cannot be activated, but can be used for retrieval of the primary VM image.

Figure 5:
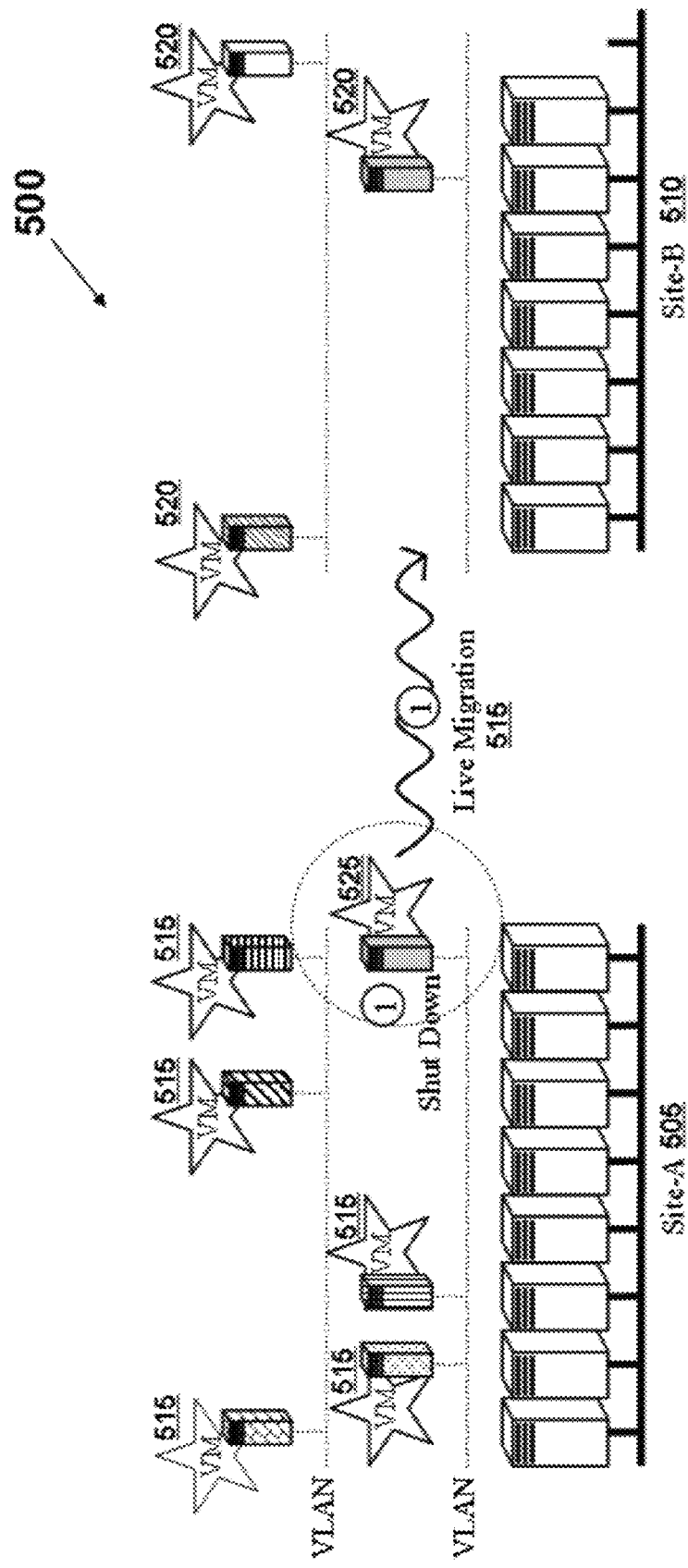
FIG. 5 illustrates a system and method of live migration of a VM image according to an exemplary embodiment.
Figure 6:
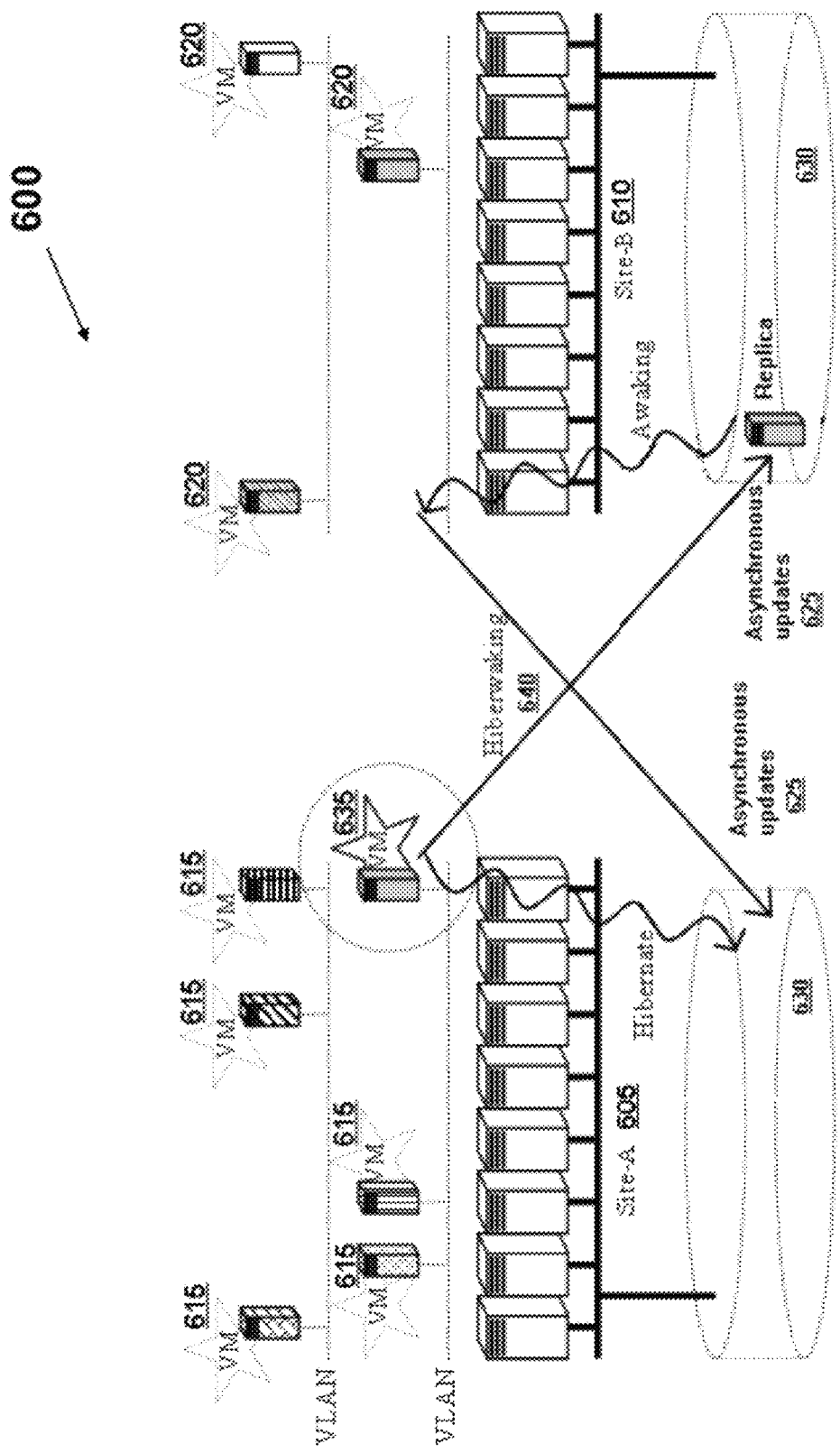
FIG. 6 illustrates a system and method of hiber-waking VM images according to an exemplary embodiment.

FIG. 5 illustrates the live migration of VM images from site-A 505, to site-B 510 after a shutdown has been effected in VM image 1 525. The other VMs 515 in cloud site-A 505 have been disregarded due to overall costs at site-A rather than the capacity of the physical hosting device at site-A. The live migration method implemented by the ECM through its submodules initiate a copy of the VM image file and associated data files to site-B 510. However, if the data file accessed by the VM image is in a SAN and is already shared seamlessly across multiple sites, then there is no need to move additional files. FIG. 6 illustrates the hiber-waking process 600, where the primary VM image 635 is deactivated (or hibernated 640) at site-A 605 and an updated replica VM image in a secondary site-B is activated (or awakened from hibernation 640). As a result, the data files associated with the previously active primary VM image at site 605 is now linked to the new primary VM image (previously a replica VM image) at site 610. The previously active primary VM image at 605 is hibernated and designated as a new replica VM image. The new replica VM image will be updated using asynchronous updates made to the new primary VM image at 610. Storage area 630 in either site represents primary storage without large processing capabilities. The result of hibernation of a replica VM image as illustrated in the case of replica VM image 605 will enable the operational costs at 605 to be much lower. This is because of decreased computational requirements and therefore, costs in terms of power and network bandwidth that is required to sustain the physical machine hosting the replica VM image at Site-A 605.

Figure 7:
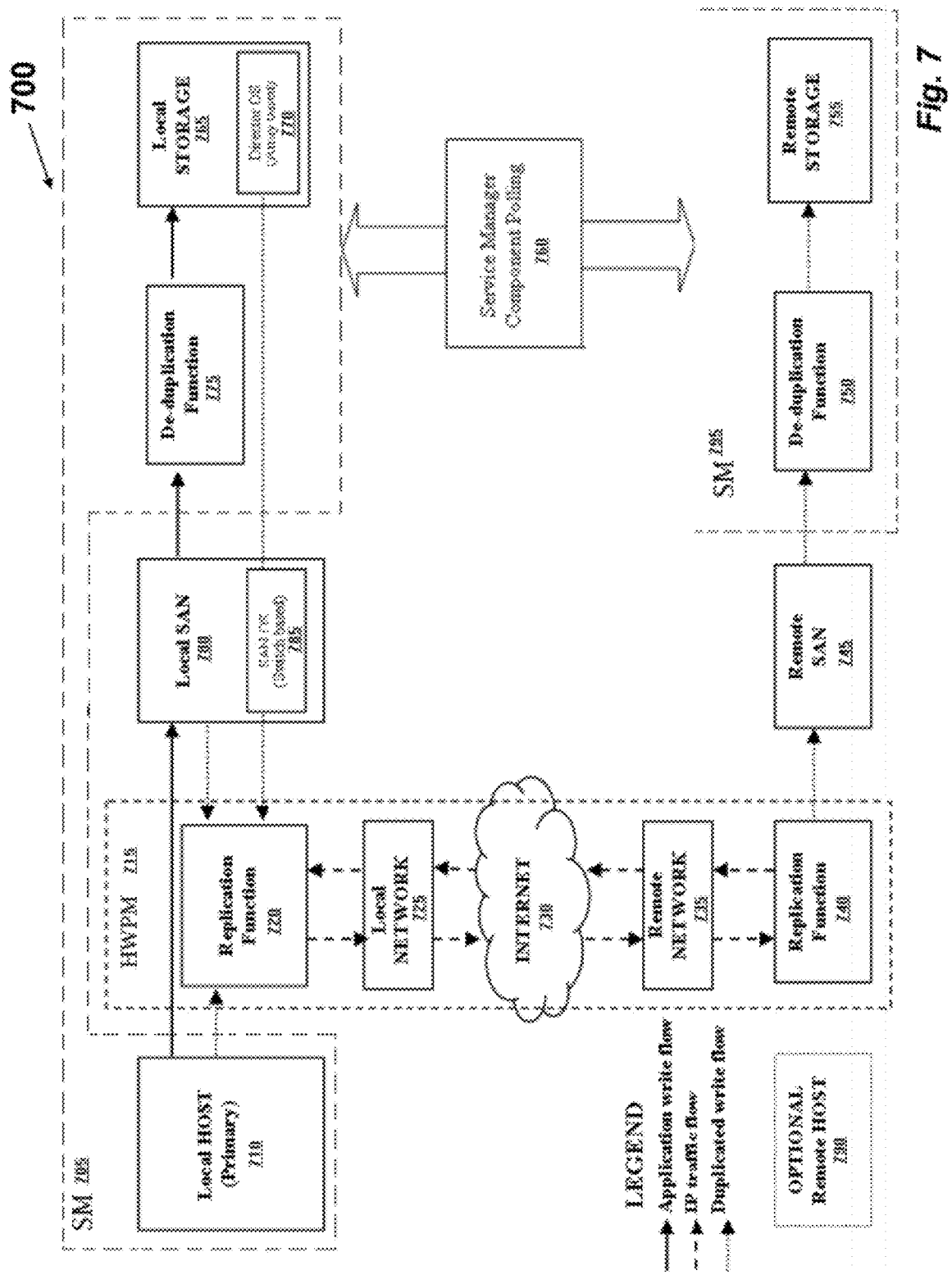
FIG. 7 illustrates the write flow of VM image data across various software modules or sub-modules before hiber-waking according to an exemplary embodiment.

FIG. 7 illustrates the interaction between various software modules of the ECM, along with the data flow across the various modules. Site manager (SM) 705 and 795 maintain reference tables for identifying the location a share storage (SAN) 780 and 745 in the case that a SAN is used to store the contents of a chunk of the VM image file for the particular site. Alternatively, the contents of a local storage 780 and 745 are indexed by SMs 705 and 795, for identifying new chucks of the image file, where the new chunks are identified by the de-duplication function 775 of the SM module on the primary site. The primary local host 710 provides the physical resources for an exemplary VM image file accessed from the site illustrated in FIG. 7. From the embodiments for combining de-duplication and replication, it is appreciated that such a combined module can be controlled by the SM or the HWPM, where appropriate.

The relationship between the target hosts 710 and 790 is also illustrated in FIG. 7. Replication function 720 within the HWPM 715 module performs the replication of new/updated image file data chunks between the primary host 710 and remote secondary or shared devices 790 through networks 725 and 735. A primary host based splitter software is used to duplicate write data for storage in multiple storage device for the multiple VM image sites. The application write flow from the local host 710 for the primary VM image file is sent to the local SAN 780, and then function 775 for de-duplication. The de-duplicated data is sent for writing into the local storage 765. The SAN operating system (OS) controls the operations of data input and output between the SM software modules. The splitter in the local SAN 780 assigns the de-duplicated data to the secondary sites via the replication function 720. The use of a splitter-based approach doubles the number of writes that is initiated by the host HWPM 715. The splitter may also allow parallel writes to multiple VM sites. This process requires a small processor load, and negligible incremental input/output load on the network, as long as the host adapter on the primary site is not saturated. The software driver for the splitter is resident in the local SAN operating system 785 driver stack, under the file system and volume manager of the OS, and interacts with the port, miniport and the multi-pathing drivers of the host device as illustrated in FIG. 7. The service manager component polling negotiates between site managers during the migration process to indicate the control of the primary image data and the status of the de-duplication efforts implemented by the primary site 705.

Additionally, FIG. 7 also demonstrates the replication of VM image data from the primary local host 710 prior to the movement from a local host and to a remote host for the purposes of migrating the primary VM image between physical devices in the cloud sites. Replication functions can also reside within the SAN switch of the SAN OS for the replication of SAN image data to remote devices. This migration process requires specialized switching hardware components for routing de-duplicate writes to the various storage devices 765, 745, and duplicate writes to the de-duplication functions and storage device 780.

Figure 8:
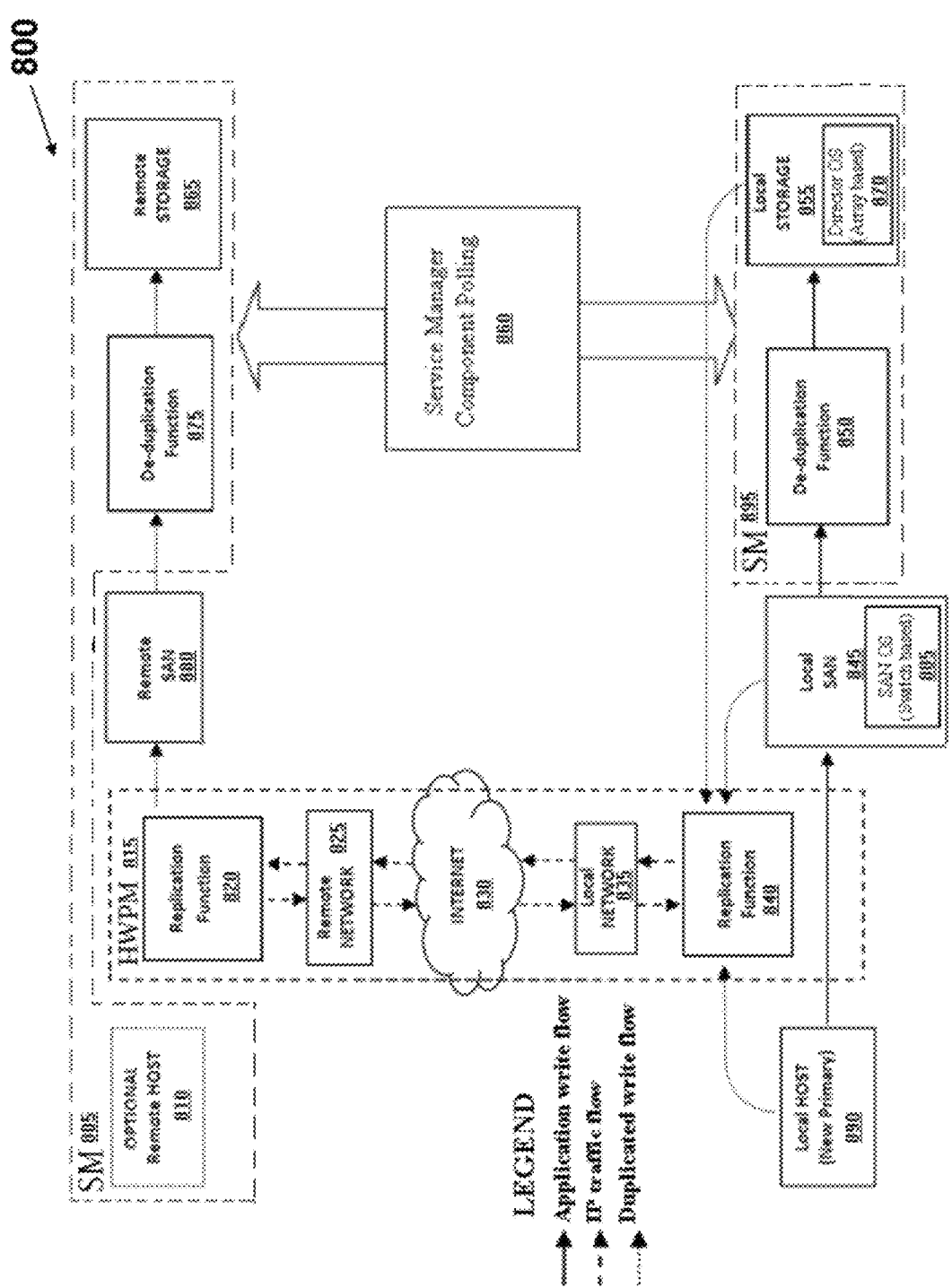
FIG. 8 illustrates the write flow of VM image data across various software modules or sub-modules after hiber-waking according to an exemplary embodiment.

FIG. 8 illustrates the system of this disclosure, where the HWPM 815 has completed re-designation of the primary VM image to the remote host 890, and designated the previously primary host 810 as a secondary site. Thereafter, de-duplication of SAN data can be implemented using the local de-duplication function 850, controlled by site SM 895. De-duplicated write flow from the remote storage 855 of the new primary site comprising host 890 is directed to the replication function for transmission to the old primary site (now new, optional remote site) comprising host 810 via remote storage 880 and 865.

Figure 9A:
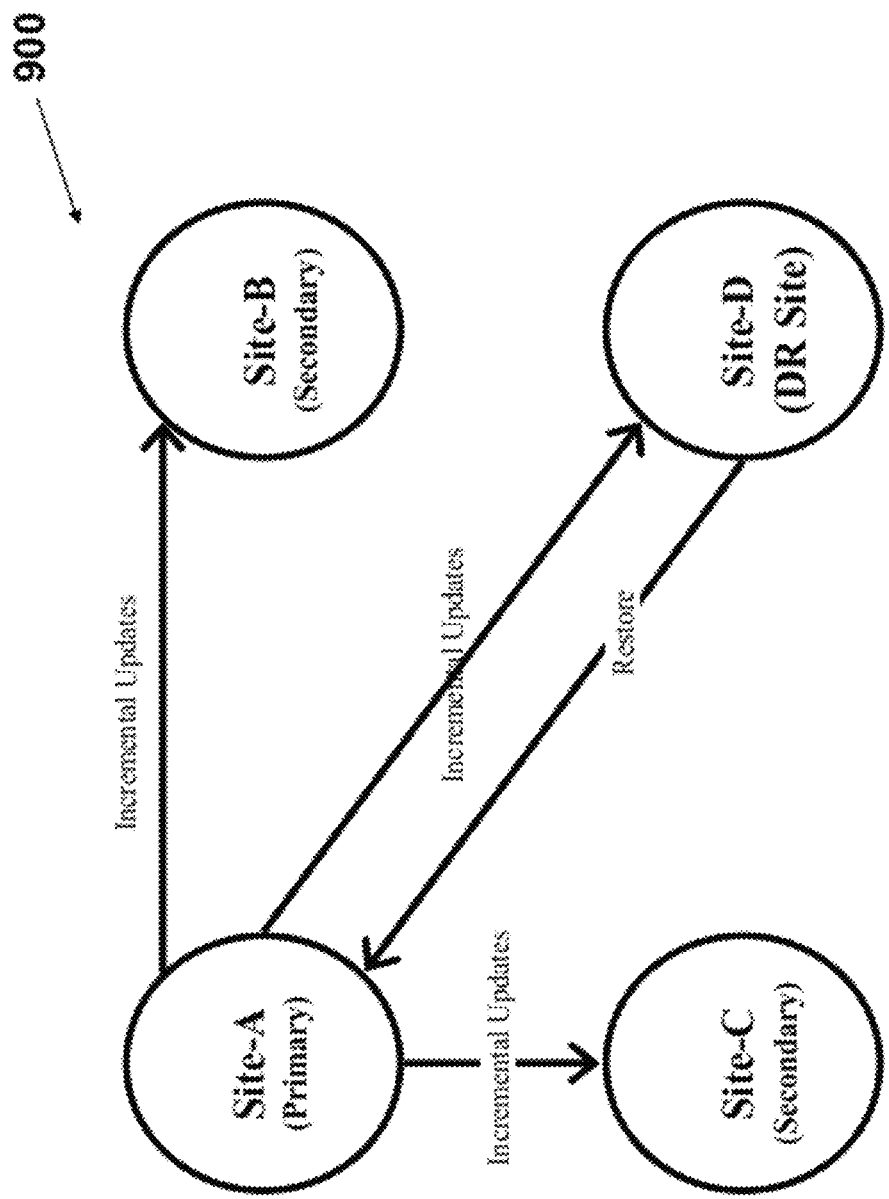
FIG. 9a illustrates a method of updating of VM images from disaster management backup sites before hiber-waking according to an exemplary embodiment.
Figure 9B:
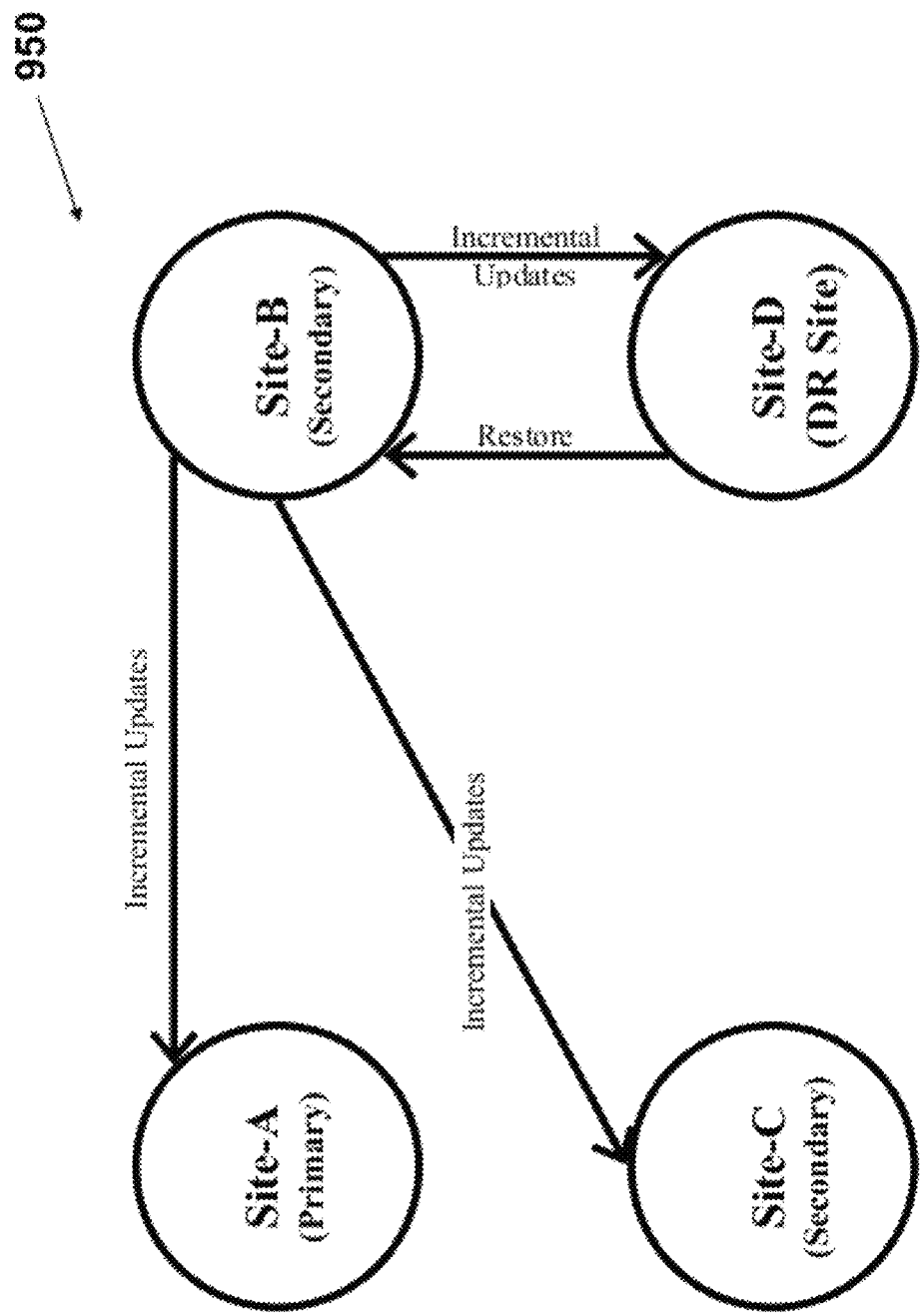
FIG. 9b illustrates a method of updating of VM images from disaster management backup sites after hiber-waking according to an exemplary embodiment.

FIG. 9a and FIG. 9b illustrate the incremental updates applied to the secondary sites, site-B and site-C, using the de-duplicated data from primary site-A 900 and 950. Site-D can be used as a permanent backup (for disaster recovery (DR) purposes) to any of the secondary sites or the primary site. Site-D will have high priority scheduling during the replication (for update propagation) for any new data from the primary site-A. Should site-D encounter a failure, priority can be assigned to one of the other secondary sites (B or C) to undertake disaster management responsibilities. However, FIG. 9a further illustrates an exemplary embodiment of a VM image file that is stored at Site-D for DR purposes, where site-D is a set at high priority for replication from primary site-A. This is an image file that can be accessed for backup by the primary VM image at site-A, if the primary image file at the site fails or becomes damaged as a result of natural or any type of disaster. The DR image file can also be accessed by the secondary sites, B and C, as well. When a secondary site is re-designated as a primary site, the incremental updates are propagated from the primary site for the VM image file and from the DR file host site (e.g., site-D in FIG. 9b) for the backup files in case of a failure at the primary site during the re-designation process.

The embodiments described above are intended to be exemplary. One skilled in the art recognizes that numerous alternative components and embodiments that may be substituted for the particular examples described herein and still fall within the scope of the invention.

What is claimed is:

1. A computer-implemented method of automatically replicating virtual machines across wide area networks, the method comprising:
   selecting, from a plurality of secondary backend computing devices, at least one secondary backend computing device for storing at least one replica of a first virtual machine for physical hosting of a first virtual machine image;

monitoring, in a primary backend computing device, the first virtual machine image for any updates, where the update to the first virtual machine image creates a second virtual machine image;

partitioning, in the primary backend computing device, the first virtual machine image into a set of first virtual machine image components, and the second virtual machine image into a set of second virtual machine image components;

indexing, in the primary backend computing device, the first set of virtual machine image components into an index of stale virtual machine image components, and the second set of virtual machine image components into an index of active virtual machine image components;

comparing, in the primary backend computing device, the set of acfive virtual machine image components to the set of stale virtual machine components to identify new active virtual machine image components, where the now active virtual machine image components are transmitted to the selected secondary backend computing device; and updating, in the selected secondary backend computing device, the at least one replica of the first virtual machine with the new active virtual machine image components, to replicate the second virtual machine image in the selected secondary backend computing device.

2. The method according to claim 1, wherein the secondary backend computing device is selected if the operating parameter values of the secondary backend computing device is within the limiting parameter values defined in a computer-coded business rule.

3. The method according to claim 2, wherein the operating parameters and the limiting parameters includes network bandwidth, processer consumption, memory capacity, power consumed, heat generated, number of access users allowed and cost of resources.

4. The method according to claim 2, wherein the limiting parameters and the limiting parameters values in the computer-coded business rule are defined by a service level agreement (SLA) between the virtual machine service provider and a client of the virtual machine service provider.

5. The method according to claim 2, wherein a set of third operating parameter values from an unrelated third virtual machine image resident on one of the plurality of secondary backend computing devices is used as the operating parameter values for comparison with the limiting parameter values, when the unrelated third virtual machine image comprises similar operating parameter values as the first virtual machine image.

6. The method according to claim 5, wherein comparing the first virtual machine image with a similar type unrelated third virtual machine image to derive the operating parameters compromises matching the operating parameter values, including data size, number of users allowed, and software application similarity of the first virtual machine image and the unrelated third virtual machine image.

7. The method according to claim 1, wherein comparing the active and stale virtual machine image components is performed by a content based redundancy elimination method, including Rabin fingerprints.

8. The method according to claim 1, wherein updating at least one replica of the first virtual machine is performed by implementing a write coalescing of the new active virtual machine image components, and then compressing the new active virtual machine image components.

9. A computer-implemented system for automatically replicating virtual machines across wide area networks, the system comprising:

selected, from a plurality of secondary backend computing devices, at least one secondary backend computing device for storing at least one replica of a first virtual machine for physical hosting of a first virtual machine image;

a primary backend computing device configured to monitor the first virtual machine image for any updates, where the update to the first virtual machine image creates a second virtual machine image;

wherein the primary backend computing device is further configured to partition the first virtual machine image into a set of first virtual machine image components, and the second virtual machine image into a set of second virtual machine image components;

wherein the primary backend computing device is further configured to index the first set of virtual machine image components into an index of stale virtual machine image components, and the second set of virtual machine image components into an index of active virtual machine image components;

wherein the primary backend computing device is further configured to compare the set of active virtual machine image components to the set of stale virtual machine components to identify new active virtual machine image components, where the new active virtual machine image components are transmitted to the selected secondary backend computing device; and wherein the selected secondary backend computing device is further configured to update the at least one replica of the first virtual machine with the new active virtual machine image components, to replicate the second virtual machine image in the selected secondary backend computing device.

10. The system according to claim 9, wherein the secondary backend computing device is selected if the operating parameter values of the secondary backend computing device is within the limiting parameter values defined in a computer-coded business rule.

11. The system according to claim 10, wherein the operating parameters and the limiting parameters includes network bandwidth, processer consumption, memory capacity, power consumed, heat generated, number of access users allowed and cost of resources.

12. The system according to claim 10, wherein the limiting parameters and its values in the computer-coded business rule are defined by a service level agreement (SLA) between the virtual machine service provider and a client of the virtual machine service provider.

13. The system according to claim 9, wherein a set of third operating parameter values from an unrelated third virtual machine image resident on one of the plurality of secondary backend computing devices is used as the operating parameter values for comparison with the limiting parameter values, when the unrelated third virtual machine image comprises similar operating parameter values as the first virtual machine image.

14. The system according to claim 13, wherein comparing the first virtual machine image with a similar type unrelated third virtual machine image to derive the operating parameters comprises matching the operating parameter values, including data size, number of users allowed, and software application similarity of the first virtual machine image and the unrelated third virtual machine image.

15. The system according to claim 9, wherein comparing the active virtual machine image components and the stale virtual machine image components is performed by a content-based redundancy elimination method, including Rabin fingerprints.

16. The system according to claim 9, wherein updating at least one replica of the first virtual machine is performed by implementing a write coalescing of the new active virtual machine image components, and then compressing the new active virtual machine image components.

17. The computer-impiemented method according to claim 1, wherein the new active virtual machine image components represent a non-redundant set of previously updated new active virtual machine image components.

\* \* \* \* \*